(12) United States Patent
Sugishita et al.

(10) Patent No.: US 6,244,039 B1
(45) Date of Patent: Jun. 12, 2001

(54) COMBINED CYCLE PLANT HAVING A HEAT EXCHANGER FOR COMPRESSED AIR

(75) Inventors: Hideaki Sugishita; Yoshiaki Tsukuda; Kazuo Uematsu; Eiji Akita, all of Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/300,841

(22) Filed: Apr. 28, 1999

(30) Foreign Application Priority Data

Apr. 28, 1998 (JP) .................................................. 10-118800
Jul. 10, 1998 (JP) .................................................. 10-195749

(51) Int. Cl.⁷ ...................................................... F02C 6/00
(52) U.S. Cl. ......................................... 60/39.182; 60/730
(58) Field of Search ........................... 60/39.182, 39.511, 60/730, 736, 39.75

(56) References Cited

U.S. PATENT DOCUMENTS

| 3,992,876 | * | 11/1976 | Aguet | ................................. | 60/39.12 |
| 4,932,204 | * | 6/1990 | Pavel et al. | ........................... | 60/39.02 |
| 5,934,065 | * | 8/1999 | Bronicki et al. | .................. | 60/39.181 |
| 6,038,850 | * | 3/2000 | Ohtomo et al. | ................... | 60/39.182 |
| 6,089,012 | * | 7/2000 | Sugishita et al. | ................. | 60/39.182 |

FOREIGN PATENT DOCUMENTS 10-131717  5/1998  (JP) .

* cited by examiner

Primary Examiner—Charles G. Freay
(74) Attorney, Agent, or Firm—Wenderoth, Lind & Ponack, L.L.P.

(57) ABSTRACT

A combined cycle plant includes a heat exchanger (3) for recovering heat into compressed air or gas turbine fuel to be supplied into gas turbine (01). The plant is arranged such that steam is used as high temperature side working medium of the heat exchanger (3). Thus, the heating medium supply passage can be made of ordinary steam piping and piping cost is reduced. Also, gas turbine exhaust gas is led directly into a waste heat recovery boiler (02), so that gas turbine efficiency and combined efficiency can be enhanced and plant manufacturing cost is reduced.

3 Claims, 5 Drawing Sheets

COMBINED CYCLE PLANT HAVING A HEAT EXCHANGER FOR COMPRESSED AIR

BACKGROUND OF THE INVENTION

1. Field of the Invention

The present invention relates to a combined cycle plant comprising a heat exchanger which uses steam as a high temperature side working medium for recovering heat into compressed air or gas turbine fuel to be supplied into a gas turbine.

2. Description of the Prior Art

As a first prior art example for carrying out this type of heat recovery, a regenerative type gas turbine combined cycle plant will be described with reference to FIG. 4.

In a combined cycle plant formed using a regenerative type gas turbine shown in FIG. 4, a regenerative type gas turbine 01 constitutes a topping cycle of the combined cycle plant and comprises a compressor 1, a generator 2 connected to the compressor 1 via a shaft, a regenerator 3 for recovering heat into compressed air discharged from the compressor 1, a combustor 4 for burning fuel (supplied from outside the cycle plant) using heated air supplied through the regenerator 3, a turbine 5 operated by combustion gas sent from the combustor 4, an exhaust gas duct 6 for supplying therethrough exhaust gas from the outlet of the turbine 5 to a heating side of the regenerator 3, and an exhaust gas duct 7 for supplying therethrough the exhaust gas from the regenerator 3 to a waste heat recovery boiler 02.

In the waste heat recovery boiler 02 supplied with the exhaust gas from the turbine 5, heat recovery is done sequentially at a high pressure steam generator 29, an intermediate pressure steam generator 28 and a low pressure steam generator 27 to generate a saturated steam of high pressure, intermediate pressure and low pressure, respectively.

The high pressure saturated steam is led into a high pressure superheater 33 via a high pressure steam pipe 34 to be elevated in temperature to a predetermined level, and is then led into a high pressure turbine 22 of a steam turbine plant constituting a bottoming cycle of the combined cycle via a high pressure steam pipe 32 to expand there to generate power.

On the other hand, the intermediate pressure saturated steam is led through an intermediate pressure steam pipe 31 to be mixed on the way with steam from the outlet of the high pressure turbine 22 and to be elevated in temperature to a predetermined level at a reheater 26, and is then led into an intermediate pressure turbine 23 to expand there to generate power.

Also, the low pressure saturated steam is led through a low pressure steam pipe 30 to be mixed on the way with steam from the outlet of the intermediate pressure turbine 23, and is then led into a low pressure turbine 24 to expand there to generate power. The steam is thereafter condensed into water at a condenser 25 to be then supplied into the waste heat recovery boiler 02.

A second prior art example for carrying out this type of heat recovery will be described with reference to FIG. 5.

In a steam cooled type gas turbine shown in FIG. 5, the system is so constructed that steam from a high pressure turbine outlet is directly used for cooling of the gas turbine blades, and is then recovered into an intermediate pressure turbine. Meanwhile, air from compressor outlet is used for cooling of a combustor tail tube.

That is, in FIG. 5, numeral 01 designates a gas turbine, numeral 02 designates a waste heat recovery boiler, numeral 57 designates a high pressure turbine, numeral 58 designates an intermediate pressure turbine and numeral 59 designates a low pressure turbine. In the gas turbine 01, air taken into a compressor 55 is compressed to a predetermined pressure, and this compressed air from the compressor 55 is mixed with fuel for combustion at a combustor 56. In this process, the flow rate of the fuel is adjusted so as to attain a predetermined at the inlet of a turbine 54.

Combustion gas of high temperature and high pressure generated at the combustor 56 is expanded at the turbine 54 to work for power generation at a generator 70, and exhaust gas from the turbine 54 is supplied into the waste heat recovery boiler 02 via an exhaust gas duct 60.

High pressure exhaust steam from the outlet of the high pressure turbine 57 is supplied into the turbine 54 as cooling steam for cooling of the stationary blades and the moving blades thereof via a blade cooling steam supply pipe 61. The cooling steam heated through this cooling process is supplied into the inlet of the intermediate pressure turbine 58 via a blade cooling steam recovery pipe 62.

In the waste heat recovery boiler 02, high pressure steam generated at a high pressure drum 53 is led into the high pressure turbine 57 via a high pressure steam pipe 63 to expand there to generate power.

Outlet steam from the high pressure turbine 57 is bifurcated so that a first portion is led as blade cooling steam for the stationary blade and moving blade of the turbine 54 via the blade cooling steam pipe 61, as mentioned above, and so that a second portion is led into a reheater 74 of the waste heat recovery boiler 02.

Intermediate pressure steam generated at an intermediate pressure drum 52 is mixed with the second portion of the high pressure exhaust steam (which is the portion of the outlet steam from the high pressure turbine 57 to be supplied into the reheater 74) to be heated there and is then mixed with the blade cooling steam led through the blade cooling steam recovery pipe 62 to be supplied into the intermediate pressure turbine 58.

The steam so mixed and supplied into the intermediate pressure turbine 58 expands there to generate a predetermined power. The intermediate pressure exhaust steam, or the outlet steam from the intermediate pressure turbine 58, is mixed with low pressure steam generated at a low pressure drum 51 and supplied through a low pressure steam pipe 65 and is then supplied into the low pressure turbine 59 for generating a predetermined power.

Low pressure exhaust steam coming out of the low pressure turbine 59 is condensed into water at a condenser 71 to then be pressurized to a predetermined level at a pressure pump 72 to be fed into the waste heat recovery boiler 02 via a feed water pipe 73.

In the first prior art example of the combined cycle plant constructed as described above, the regenerative type gas turbine plant acting as the topping cycle of the combined cycle plant comprises the regenerator 3, as compared with a conventional simple gas turbine, so that the exhaust gas heat is recovered into the inlet of the combustor 4. Thus, the inlet temperature of the combustor 4 is elevated and an advantage is obtained of reducing the fuel flow rate and thus enhancing the gas turbine efficiency and the combined efficiency.

In order to obtain this advantage, however, it is necessary to provide a piping of the exhaust gas duct 6, which has a large size, from the outlet of the turbine 5 to the regenerator 3. It is also necessary to provide a piping of the exhaust gas duct 7, which is downstream thereof, from the regenerator 3 to the waste heat recovery boiler 02. Thus, the cost of the plant increases because the cost of the exhaust ducts 6, 7 is high.

Also, as the exhaust gas from the turbine 5 is first supplied into the regenerator 3 to pass therethrough, there occurs a large pressure loss of the exhaust gas. This reduces the turbine pressure ratio to hinder the original intent of the regenerative type gas turbine to enhance the turbine efficiency and the combined efficiency.

Furthermore, the heat exchange at the regenerator 3 is between the exhaust gas on the high temperature side and the compressed air on the low temperature side, and the heat transfer coefficient of the high temperature side heat transfer surface of the regenerator 3 is smaller as compared with the heat exchange with steam. As a result, the heat transfer area of the regenerator 3 becomes larger as compared with the heat exchanger of the waste heat recovery boiler in which the high temperature side is the exhaust gas and the low temperature side is the steam, which leads to a cost increase.

Also, in the second prior art example of the combined cycle plant, the blade cooling steam for cooling, the turbine stationary blade and moving blade of the steam cooled gas turbine is supplied directly from the high pressure exhaust steam coming out of the high pressure turbine 57. Therefore, if the inlet temperature or the inlet guide vane opening of the gas turbine or atmospheric air temperature or the like changes, the outlet temperature of the high pressure turbine 57 must change correspondingly. Thus, the temperature of the blade cooling steam also changes.

Change in the temperature of the blade cooling steam leads at the same time to a change in the temperature of the metal of the turbine blade or the like. Thus, particularly at the time of partial load, because the temperature of the blade cooling steam is prone to become high, there occurs a problem that the turbine blade is likely to cause a creep deformation.

As a general attempt to control the cooling steam supply temperature to cope with a tendency of high temperature of the cooling steam, it is considered to supply spray water into the cooling steam. However, in this case, in the process of the spray water being mixed with steam to be vaporized, impurities in the spray water come to be included in the cooling steam and stick to cooling passages of the steam cooled blade, which results in a possibility of corrosion of the steam cooled blade.

Also, in addition to the problem of corrosion, the impurities sticking to the cooling passages of the steam cooled blade reduces the heat transfer coefficient of the cooling passages, so that the temperature of the blade metal increases and there arises a possibility of creep deformation of the blade.

Corrosion of the cooling passages of the steam cooled blade makes the thickness of the blade thinner, so that cracks therein may be caused. In addition, there arises a possibility of leakage of the cooling steam into the turbine 54 of the gas turbine 01. Also, it is known that such leakage of the steam reduces the combined efficiency. Hence, it is an important matter to be avoided to have the impurities causing the corrosion mixed into the cooling steam.

SUMMARY OF THE INVENTION

In view of the mentioned problem in the first prior art example which is an obstacle in realizing a combined cycle plant using a regenerative type gas turbine, it is an object of the present invention to provide a combined cycle plant using a regenerative type gas turbine in which the problem in the prior art is resolved, piping cost and manufacturing cost are reduced, and enhancement of gas turbine efficiency and combined efficiency is attained.

Also, it is an object of the present invention to provide a combined cycle-plant in which the mentioned problem in the second prior art example is resolved and a high pressure exhaust steam to be used as cooling steam is maintained at an appropriate temperature so as to be used for cooling without shortcomings causing corrosion etc.

In order to attain this object, the present invention provides a combined cycle plant comprising a gas turbine provided with a heat exchanger for recovering heat into compressed air or gas turbine fuel; a waste heat recovery boiler supplied with exhaust gas from the gas turbine as a heat source; and a steam turbine operated by steam generated at the waste heat recovery boiler. In particular, the heat exchanger is supplied with steam to its heating side.

According to the present invention, the heat exchanger carries out heat recovery into the compressed air or the gas turbine fuel to be supplied into the gas turbine combustor and the heat source thereof is taken, for example, from the steam generated at the waste heat recovery boiler or from the high pressure exhaust steam of the high pressure turbine. In the heat recovery system, sufficient heat transfer area is secured so as to carry out an efficient heat recovery. In the heating system, no gas turbine exhaust gas is employed and no large exhaust gas duct is needed as the heating medium supply passage to thereby attain a compact construction with reduced piping cost. This arrangement as a whole results in enhancement of the gas turbine efficiency and the combined efficiency.

Also, the present invention provides a combined cycle plant as mentioned above, in which the heat exchanger is a regenerator, and this regenerator is supplied at its heating side with a portion of the steam generated by the waste heat recovery boiler.

According to the present invention, the regenerator carries out heat recovery into the compressed air which is to be supplied to the gas turbine and the heat source thereof is taken from the steam generated at the waste heat recovery boiler. Thus, as compared with the regenerator whose heat source is taken directly from the gas turbine exhaust gas, a large exhaust gas duct is not needed as the heating medium supply passage and only an ordinary steam piping may be used sufficiently so that piping cost therefor can be reduced. Also, the gas turbine exhaust gas is led directly into the waste heat recovery boiler so that the gas turbine efficiency and the combined efficiency can be enhanced. Furthermore, the heat transfer area of the regenerator is reduced, which results in reduction of the manufacturing cost.

Also, the present invention provides a combined cycle plant as mentioned above, in which the steam supplied to the heating side of the regenerator is a high pressure steam generated at a high pressure steam generator of the waste heat recovery boiler.

According to the present invention, the steam to be supplied as the heating source of the regenerator is taken from the high pressure steam generated at the high pressure steam generator of the waste heat recovery boiler, that is, steam is used as the heating source. Thus, as in the above-mentioned case, the piping cost can be reduced, the gas turbine efficiency and the combined efficiency can be enhanced and the manufacturing cost can be reduced. In addition thereto, because the high pressure steam has a wider pressure range and temperature range, control of the pressure and temperature in the regenerator can be done sufficiently and a large freedom of operation condition can be obtained.

Also, the present invention provides a combined cycle plant as mentioned above, in which the steam supplied to the heating side of the regenerator is an intermediate pressure steam generated at an intermediate pressure steam generator of the waste heat recovery boiler.

According to the present invention, the steam to be supplied as the heating source of the regenerator is taken from the intermediate pressure steam generated at the intermediate pressure steam generator of the waste heat recovery boiler. Thus, according to the size of plant, the high pressure steam generator system constituting a portion of the waste heat recovery boiler is eliminated and a large reduction of the plant designing and manufacturing cost can be attained.

Further, the present invention provides a combined cycle plant as mentioned above, in which the heat exchanger is a fuel heater for heating gas turbine fuel by high pressure exhaust steam of a high pressure turbine to be used as cooling steam for cooling a gas turbine blade and a combustor tail tube, and in which the cooling steam carries out heat exchange with the gas turbine fuel at the fuel heater and is then cooled at a cooling device in which cooling temperature is controllable. Thereafter, the steam is supplied into a portion to be cooled of the gas turbine blade and the combustor tail tube.

According to the present invention, before the high pressure exhaust steam of the high pressure turbine is supplied into the high temperature portion of the gas turbine as the gas turbine blade cooling steam and the combustor tail tube cooling steam, it passes through the fuel heater to be cooled by the gas turbine fuel for heat recovery and is then cooled to a predetermined temperature at the cooler which is able to control the cooling temperature to be then used for the predetermined cooling. Thus, the high pressure exhaust steam as the cooling steam can be controlled at any operation condition to a necessary temperature within the allowable temperature of the metal for appropriate cooling of the turbine blade and the combustor tail tube. Yet, there is still no fear of impurities mixing into the cooling steam during the above-mentioned process. Hence, a reduction of the heat transfer coefficient of the cooling passages and an occurrence of corrosion or the like is avoided, and a large contribution to enhancement of the efficiency of the combined cycle plant can be attained.

DESCRIPTION OF THE PREFERRED EMBODIMENTS

Figure 1:
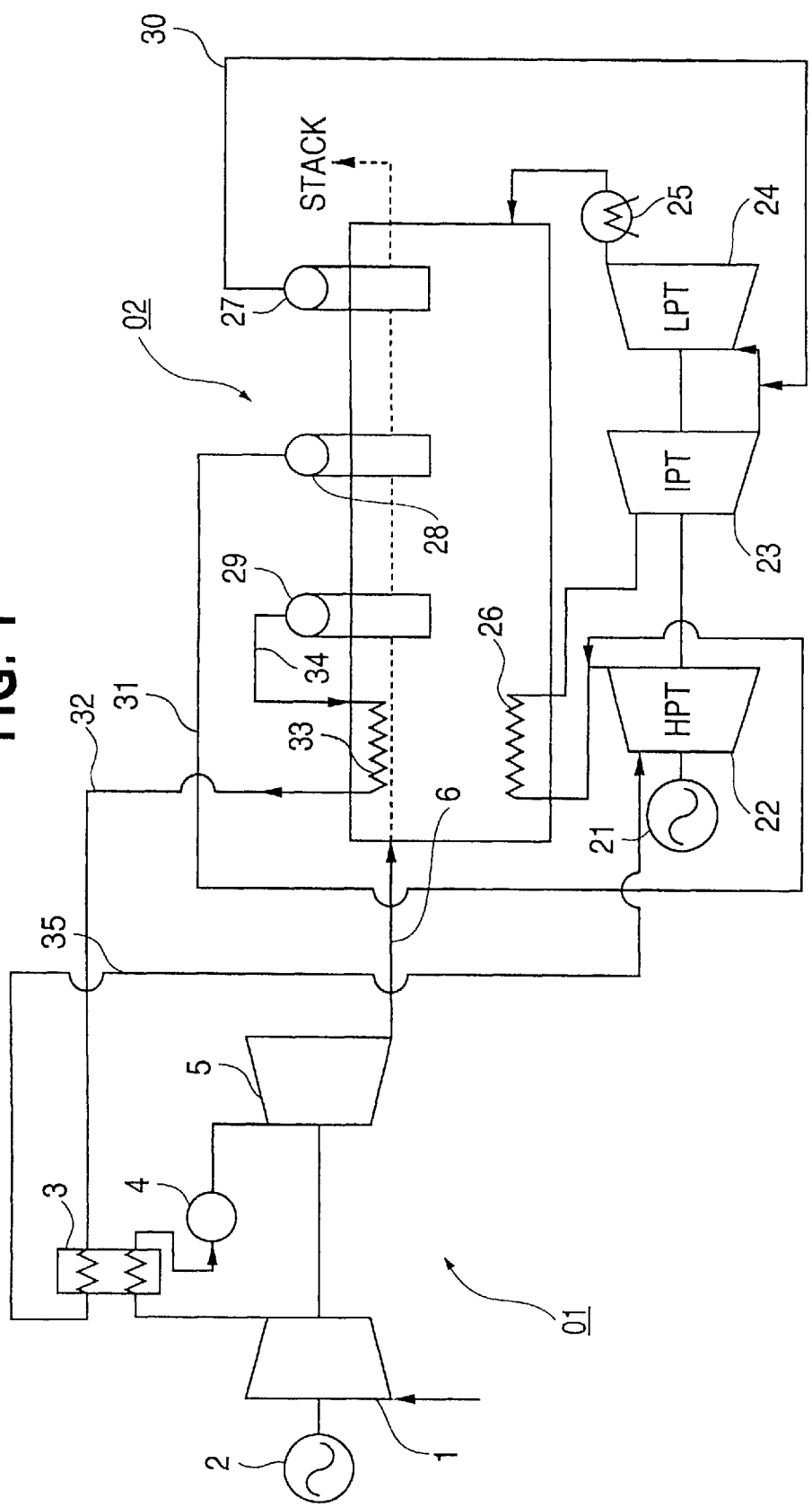
FIG. 1 is a schematic view of a combined cycle plant of a first embodiment according to the present invention.
Figure 4:
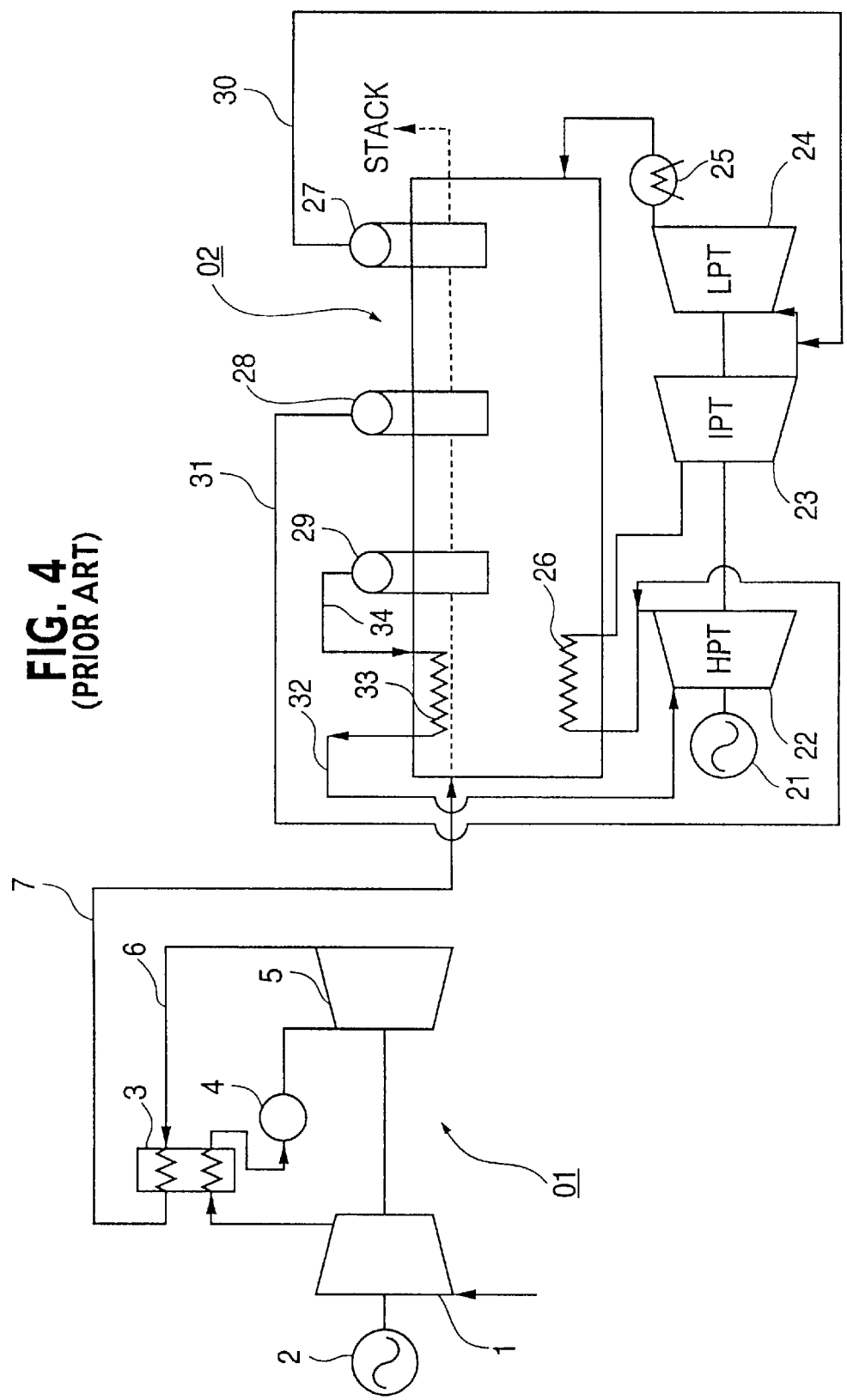
FIG. 4 is a schematic view of a combined cycle plant using a regenerative type gas turbine as a first prior art example.

A first embodiment according to the present invention will be described with reference to FIG. 1. It is to be noted that the same parts as those described in the first prior art example shown in FIG. 4 are given the same reference numerals with repeated description being omitted, and characteristic portions of the present embodiment will be described mainly.

In the present embodiment, while the prior art regenerative type gas turbine combined cycle plant as mentioned has the exhaust gas supplied directly to the regenerator 3 through the exhaust gas duct 6 to be regenerated of heat, the construction here is such that high pressure superheated steam from a waste heat recovery boiler 02 is supplied to a regenerator 3 through a high pressure superheated steam pipe 32 to be regenerated of heat.

More concretely, in the present embodiment, a regenerative type gas turbine plant 01 of the regenerative type gas turbine combined cycle comprises a compressor 1, a generator 2, a regenerator 3 constituting a heat exchanger with a heat-source side and a heated-medium side, a combustor 4, a gas turbine 5 and an exhaust gas duct 6.

Also, in the waste heat recovery boiler 02 using exhaust gas from the gas turbine 5 as a heat source, saturated steam is generated at a high pressure steam generator 29, an intermediate pressure steam generator 28 and a low pressure steam generator 27, respectively.

Intermediate pressure saturated steam flows through an intermediate pressure steam pipe 31 to be mixed with outlet steam from a high pressure turbine 22 and is heated to a predetermined temperature at a reheater 26 to then expand at an intermediate pressure turbine 23 to generate a power.

Low pressure saturated steam led through a low pressure steam pipe 30 is mixed with outlet steam from an intermediate pressure turbine 23 to then expand at a low pressure turbine 24 to generate an output and is thereafter condensed into water at a condenser 25 to be then circulated to the waste heat recovery boiler 02.

On the other hand, high pressure saturated steam is led to a high pressure superheater 33 through a high pressure steam pipe 34 to be heated to a high pressure superheated steam of predetermined temperature. The steam is then led therefrom to the heat-source side of regenerator 3 through a high pressure steam pipe 32 to be heat-exchanged with high pressure air (in the heated-medium side) from a compressor 1 and is thereafter led to the high pressure turbine 22 through a high pressure steam pipe 35 to expand there to generate a predetermined power.

In the prior art regenerative type gas turbine combined cycle plant mentioned above, heat from the exhaust gas supplied through the large exhaust gas duct 6 is recovered at the regenerator 3 and the larger exhaust gas duct 7 is provided extending to the waste heat recovery boiler 02. In the present embodiment, however, the construction is so changed that heat from the high pressure superheated steam supplied through the high pressure steam pipe 32 is recovered at the regenerator 3 which is a heat exchanger, and the high pressure steam pipe 35 is provided extending to the high pressure turbine 22, so that the following effects can be obtained:

1. In supplying the heating medium as a heat source of the regenerator 3, there is no need to employ a large piping such as the exhaust gas duct because of the heat transfer surface, and the high pressure steam pipes 32, 35 as ordinary steam pipes are sufficient. Hence, there is an effect to reduce the piping cost in designing and manufacturing the plant.

2. Exhaust gas from the turbine 5 does not pass through the regenerator 3 but is supplied directly to the waste heat recovery boiler 02. Thus, by not passing through the regenerator 3, pressure loss of the exhaust gas, which affects the gas turbine efficiency and the combined efficiency, can be reduced and the turbine pressure ratio can be increased. Hence, there is an effect to increase the turbine output and to enhance the gas turbine efficiency and the combined efficiency.

3. In the regenerator 3, while the prior art uses exhaust gas on the high temperature side and air on the low temperature side as a working medium for heat exchange, the present invention uses steam on the high temperature side and air on the low temperature side. Thus, the high temperature side heat transfer coefficient can be enhanced and there is an effect to reduce the heat transfer area of the regenerator 3 and to reduce the cost therefor.

Figure 2:
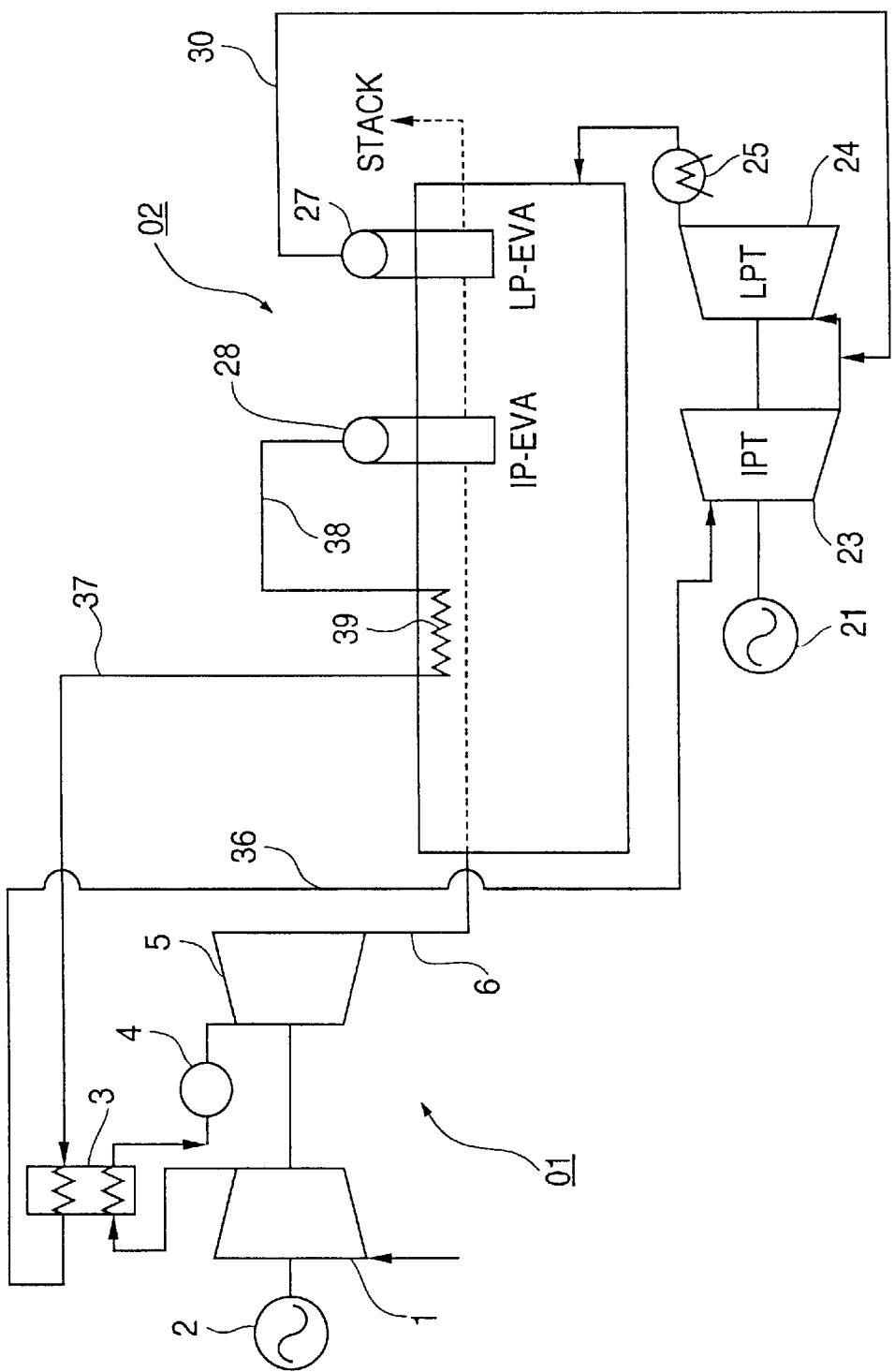
FIG. 2 is a schematic view of a combined cycle plant of a second embodiment according to the present invention.

Next, a second embodiment according to the present invention will be described with reference to FIG. 2. It is to be noted that same parts as those of the mentioned first embodiment are given the same reference numerals with repeated description being omitted.

In the present embodiment, a regenerative type gas turbine plant 01 of the regenerative type gas turbine combined cycle plant comprises a compressor 1, a generator 2, a regenerator 3, a combustor 4, a gas turbine 5 and an exhaust gas duct 6 and basic construction thereof is the same as that of the first embodiment.

However, in the waste heat recovery boiler 02, the high pressure steam generator 29 and the high pressure turbine 22 are eliminated, so that construction elements of the bottoming cycle may be simplified and cost reduction may be attained.

Thus, because no high pressure steam is generated, intermediate pressure saturated steam flows through an intermediate pressure steam pipe 38 to be heated at an intermediate pressure reheater 39. This intermediate pressure superheated steam is led to the regenerator 3 through an intermediate pressure steam pipe 37 to be reduced in temperature there, and is thereafter led directly to an intermediate pressure turbine 23, wherein the reheater 26 is also eliminated.

Thus, in the present embodiment, the high pressure steam generator 29 and the high pressure turbine 22 are eliminated and there is an effect to further simplify the construction elements of the bottoming cycle and to reduce the cost therefor.

Figure 5:
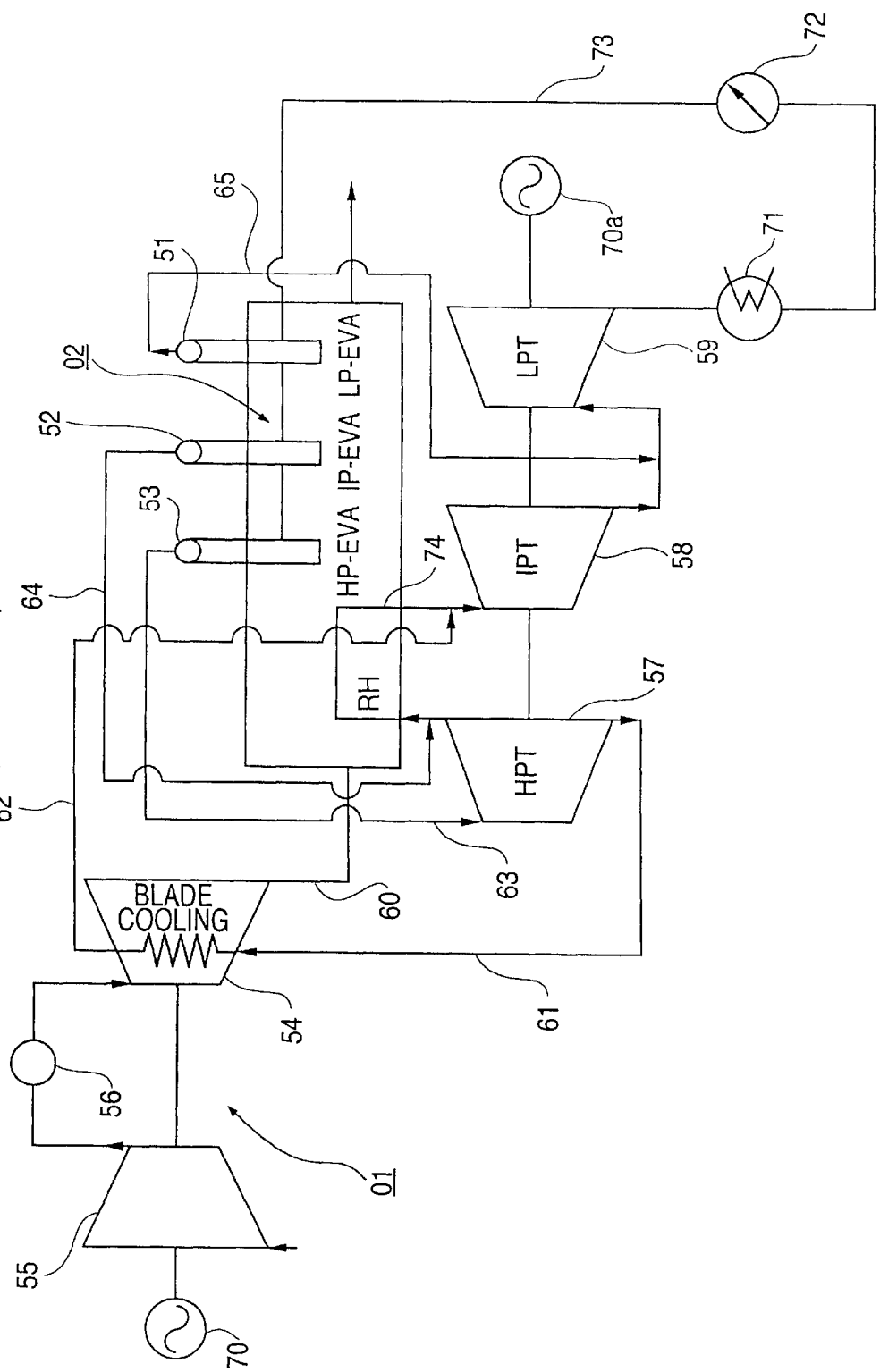
FIG. 5 is an explanatory view showing a steam cooled type gas turbine system as a second prior art example.

A third embodiment according to the present invention will be described with reference to FIG. 3. It is to be noted that the same parts as those described in the second prior art example shown in FIG. 5 are given the same reference numerals with repeated description being omitted, and characteristic portions of the present embodiment will be described mainly.

Figure 3:
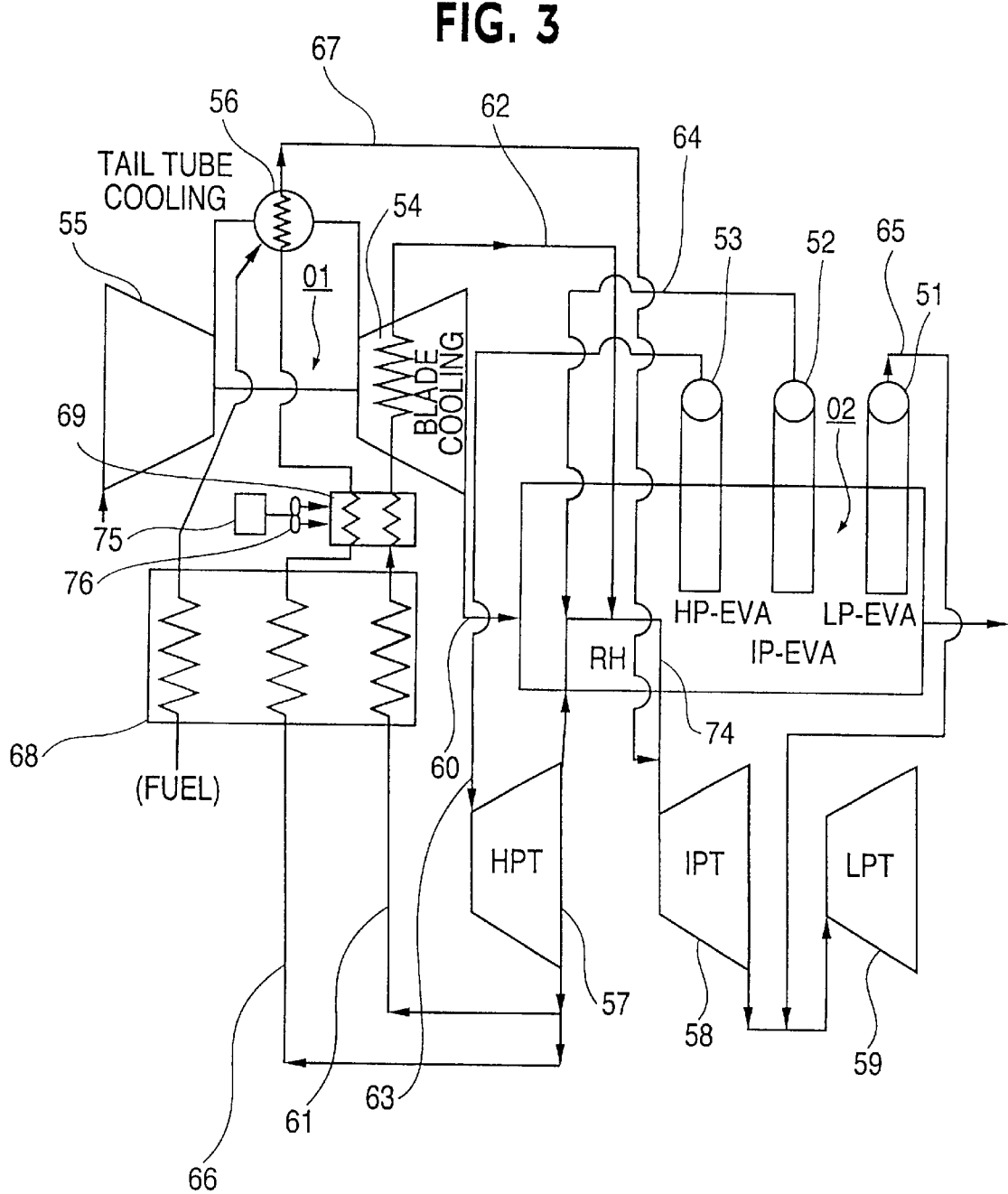
FIG. 3 is a schematic view of a combined cycle plant of a third embodiment according to the present invention.

In FIG. 3, numeral 68 designates a fuel heater, which is a heat exchanger, and comprises a blade cooling steam supply pipe 61 and a tail tube cooling steam supply pipe 66 both for leading therethrough a high pressure exhaust steam of a high pressure turbine 57 to a high temperature portion to be cooled of a gas turbine 01 and a fuel passage for leading therethrough a fuel to a combustor 56.

Numeral 69 designates a cooler, which takes in the blade cooling steam supply pipe 61 and the tail tube cooling steam supply pipe 66 both extending from the fuel heater 68 at an upstream position of a turbine 54 and the combustor 56. The cooler 69 is adapted to control the cooling temperature by a variable speed motor 75 disposed outside thereof and a fan 76 driven by this motor 75.

In the present embodiment constructed as above, a portion of the high pressure exhaust steam discharged from the outlet of the high pressure turbine 57 is led to the fuel heater and the tail tube cooling steam supply pipe 66 for heat exchange there to heat the gas turbine fuel or to be cooled itself. The steam is then supplied to the cooler 69 through the blade cooling steam supply pipe 61 and the tail tube cooling steam supply pipe 66 to be reduced in temperature to a predetermined level.

In the cooler 69, the rotational speed of the motor 75 disposed outside of the cooler 69 opposing thereto is controlled by an appropriate control device (not shown) and thereby rotational speed of the fan 76 is controlled. Thus, the reduction in temperature of the steam in the cooler 69 supplied through the blade cooling steam supply pipe 61 and the tail tube cooling steam supply pipe 66 is controlled.

That is, in the present embodiment, there is provided the cooler 69 as a cooling device, as mentioned above, which is operated so as to control the cooling temperature using the motor 75 and the fan 76. Thus, in a rated operation time or partial load operation time of the gas turbine plant 01, the cooling steam supply temperature can be controlled and adjusted to a desired temperature.

Moreover, in the present embodiment, when the cooling steam temperature is to be controlled as mentioned above, no supply of spray water into supply passages of the cooling steam is provided, and the cooling steam supply temperature is reduced by the heat exchange at the cooler. Hence, there arises no fear of mixing of impurities into the cooling steam.

Also, in the present embodiment, the cooling steam supply temperature can be controlled to a predetermined level both in the rated operation time and the partial load operation time as mentioned above. Thus, reliability of the stationary blade and the moving blade of the turbine 54 is ensured and enhancement of the combined efficiency by virtue of the fuel heating can be expected.

It is understood that the invention is not limited to the particular construction and arrangement herein illustrated and described but embraces such modified forms thereof as come within the scope of the appended claims.

What is claimed is:

1. A combined cycle power plant comprising:
a gas turbine plant including a heat exchanger having a heat-source side and a heated-medium side, said heated-medium side being adapted to receive compressed air;
a waste heat recovery boiler connected to said gas turbine plant so as to receive exhaust gas from said gas turbine plant for generating steam, said waste heat recovery boiler being connected to said gas turbine plant so as to supply a portion of the generated steam to said heat-source side of said heat exchanger; and
a steam turbine plant connected to said waste heat recovery boiler so as to receive the generated steam from said waste heat recovery boiler.

2. A combined cycle power plant comprising:
a gas turbine plant including a heat exchanger having a heat-source side and a heated-medium side, said heated-medium side being adapted to receive compressed air;
a waste heat recovery boiler connected to said gas turbine plant so as to receive exhaust gas from said gas turbine plant for generating steam, said waste heat recovery boiler including a high-pressure steam generator for generating high-pressure steam, said high-pressure steam generator being connected to said gas turbine plant so as to supply steam to said heat-source side of said heat exchanger; and a steam turbine plant connected to said waste heat recovery boiler so as to receive steam generated by said waste heat recovery boiler.

3. A combined cycle power plant comprising:

a gas turbine plant including a heat exchanger having a heat-source side and a heated-medium side, said heated-medium side being adapted to receive compressed air;

a waste heat recovery boiler connected to said gas turbine plant so as to receive exhaust gas from said gas turbine plant for generating steam, said waste heat recovery boiler including an intermediate-pressure steam generator for generating intermediate-pressure steam, said intermediate-pressure steam generator being connected to said gas turbine plant so as to supply steam to said heat-source side of said heat exchanger; and a steam turbine plant connected to said waste heat recovery boiler so as to receive steam generated by said waste heat recovery boiler.

* * * * *